US012752432B2

(12) United States Patent
Yoshimoto et al.

(10) Patent No.: US 12,752,432 B2
(45) Date of Patent: Oct. 6, 2026

(54) WORK MEASURING METHOD AND WELDING SYSTEM

(71) Applicant: Kobe Steel, Ltd., Kobe (JP)

(72) Inventors: Tatsuya Yoshimoto, Kobe (JP); Akira Okamoto, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 188 days.

(21) Appl. No.: 18/654,187

(22) Filed: May 3, 2024

(65) Prior Publication Data

US 2024/0424679 A1 Dec. 26, 2024

(30) Foreign Application Priority Data

Jun. 21, 2023 (JP) ................................ 2023-101761

(51) Int. Cl.

| | |
|---|---|
| ***B25J 9/16*** | (2006.01) |
| ***B23K 37/02*** | (2006.01) |
| ***G06T 7/62*** | (2017.01) |
| ***G06T 7/73*** | (2017.01) |

(52) U.S. Cl.

CPC ......... *B25J 9/1697* (2013.01); *B23K 37/0229* (2013.01); *G06T 7/62* (2017.01); *G06T 7/73* (2017.01); *G06T 2207/10028* (2013.01); *G06T 2207/30164* (2013.01); *G06T 2207/30242* (2013.01)

(58) Field of Classification Search

USPC .................................................. 700/245–264

See application file for complete search history.

(56) References Cited

U.S. PATENT DOCUMENTS

| | | | | |
|---|---|---|---|---|
| 8,338,743 | B2 * | 12/2012 | Wanner | G05B 19/4207 219/121.64 |
| 12,521,884 | B2 * | 1/2026 | Schwenker | B23K 31/02 |
| 2016/0365825 | A1 * | 12/2016 | Poivet | F24S 20/66 |
| 2018/0065204 | A1 * | 3/2018 | Burrows | B25J 11/007 |
| 2022/0305593 | A1 * | 9/2022 | Lonsberry | B25J 9/1697 |
| 2023/0390853 | A1 * | 12/2023 | Yang | B25J 5/00 |
| 2023/0390934 | A1 * | 12/2023 | Christy | B25J 9/1664 |

FOREIGN PATENT DOCUMENTS

| | | | | |
|---|---|---|---|---|
| JP | H 10-156775 A | | 6/1998 | |
| JP | 2010-162554 A | | 7/2010 | |
| JP | 2010-276485 A | | 12/2010 | |
| KR | 10-2006-0012385 A | | 2/2006 | |
| KR | 10-2011-0032851 A | | 3/2011 | |
| KR | 10-2018-0076966 A | | 7/2018 | |
| KR | 10-2022-0170101 A | | 12/2022 | |
| WO | WO-2022182894 A1 | * | 9/2022 | B25J 9/161 |

* cited by examiner

*Primary Examiner* — Jonathan L Sample

(74) *Attorney, Agent, or Firm* — Oblon, McClelland, Maier & Neustadt, L.L.P.

(57) ABSTRACT

A work measuring method for measuring a work including a columnar member and a diaphragm and held by a positioner includes an acquiring step of acquiring point cloud data on a surface of the work held by the positioner and photographed in a predetermined direction, a detecting step of identifying a portion where distribution of the point cloud data changes in a three-dimensional coordinate system of the positioner and detecting the portion as a boundary position between the columnar member and the diaphragm, and a deriving step of deriving the number of columnar members and diaphragms included in the work on the basis of the boundary position detected in the detecting step.

8 Claims, 11 Drawing Sheets

WORK MEASURING METHOD AND WELDING SYSTEM

BACKGROUND OF THE INVENTION

1. Field of the Invention

The present invention relates to a work measuring method and a welding system.

2. Description of the Related Art

In the related art, an object to be welded (hereinafter also referred to as "work") is prepared at a predetermined position and welded by using a welding robot. In this case, for the purpose of automatic welding and the like of the work, there is a need to facilitate measurement of the shape and installation condition of the work and achieve labor-saving. To measure the position of the work, for example, point cloud data acquired by using a time-of-flight (ToF) sensor is used.

As an example of measuring the dimensions of a work in a welding system, Japanese Unexamined Patent Application Publication No. 2010-162554 discloses a configuration in which a measurement program is selected in accordance with the shape of an object to be measured (hereinafter referred to as "measurement object") and the measurement object is measured using a sensor included in a welding robot. As an example of measuring a measurement object, Japanese Unexamined Patent Application Publication No. 2010-276485 discloses a configuration in which three-dimensional data of a measurement object placed on a glass table is measured by a laser measuring device and the three-dimensional shape of the entire measurement object, as seen from multiple viewpoints, is acquired.

For example, in the technique disclosed in Japanese Unexamined Patent Application Publication No. 2010-162554, a touch sensor is assumed to be used as a sensor. In operation of the sensor according to the measurement program, if there is some distance between the start position of measurement by the sensor and the actual installation position of the measurement object, it takes time to carry out measurement due to an unnecessary measurement operation. In the technique disclosed in Japanese Unexamined Patent Application Publication No. 2010-162554, the measurement program is to be switched from one to another in accordance with the shape of the measurement object, and this involves manual selection of the measurement program. Additionally, if there is a work installation error in a positioner, incorrect dimensions may be measured. The configuration disclosed in Japanese Unexamined Patent Application Publication No. 2010-276485 requires many sensors, and this may increase the cost and size of the device.

SUMMARY OF THE INVENTION

An object of the present invention is to accurately measure the configuration of a measurement object while making the time required to measure the measurement object shorter than before.

An aspect of the present invention has the following configuration to solve the problems described above. That is, a work measuring method for measuring a work including a columnar member and a diaphragm and held by a positioner includes an acquiring step of acquiring point cloud data on a surface of the work held by the positioner and photographed in a predetermined direction, a detecting step of identifying a portion where distribution of the point cloud data changes in a three-dimensional coordinate system of the positioner and detecting the portion as a boundary position between the columnar member and the diaphragm, and a deriving step of deriving the number of columnar members and diaphragms included in the work on the basis of the boundary position detected in the detecting step.

Another aspect of the present invention has the following configuration. That is, a welding system includes a welding robot including a welding torch, a welding control device configured to control the welding robot, a positioner configured to hold a work including a columnar member and a diaphragm, and a sensor configured to photograph the work in a predetermined direction to acquire point cloud data. The welding control device includes an acquiring unit configured to acquire point cloud data on a surface of the work held by the positioner and photographed by the sensor in the predetermined direction, a detecting unit configured to identify a portion where distribution of the point cloud data changes in a three-dimensional coordinate system of the positioner and detect the portion as a boundary position between the columnar member and the diaphragm, and a calculating unit configured to calculate a dimension and position of the work on the basis of the boundary position detected by the detecting unit.

The present invention makes it possible to accurately measure the configuration of a measurement object while making the time required to measure the measurement object shorter than before.

DESCRIPTION OF THE PREFERRED EMBODIMENTS

Figure 1:
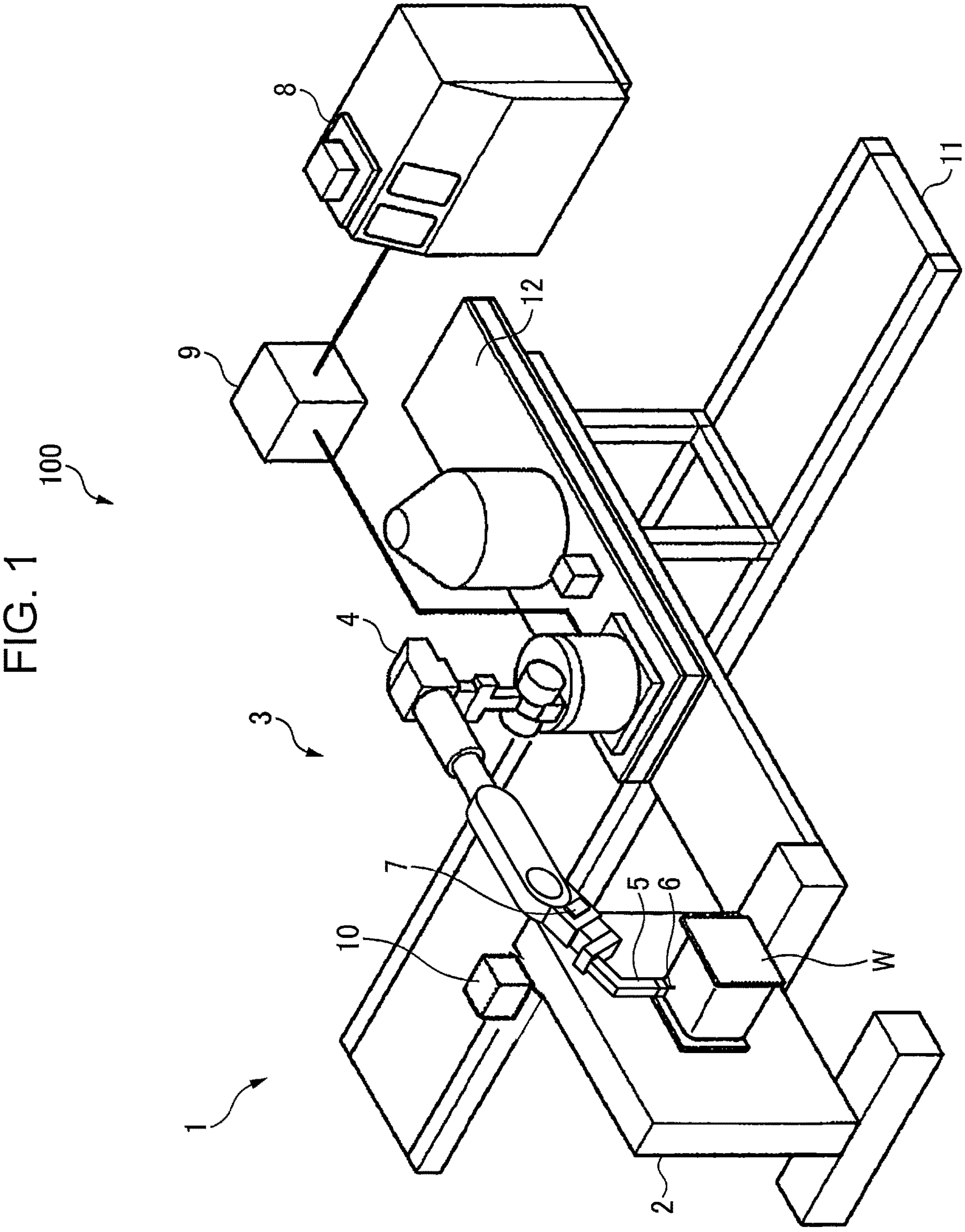
FIG. 1 is an external perspective view illustrating an overall structure of a welding system according to an embodiment of the present invention.

Hereinafter, embodiments for carrying out the present invention will be described with reference to the drawings.

Each of the embodiments to be described is an example for explaining the present invention, and is not intended to be interpreted as limiting the present invention. Not all components described in the embodiments are necessarily essential for solving the problems to be solved by the present invention. In the drawings, the same constituent elements are assigned the same reference numerals to indicate their correspondence relations. In the embodiments, the terms “first” and “second” are merely used for distinction from other elements, and are not intended to be interpreted as specific elements in a limited manner. Accordingly, these terms may be interpreted as appropriate in accordance with the combination or the number of constituent elements.

First Embodiment

An embodiment according to the present invention will now be described with reference to the drawings.

[Configuration of Welding System]

FIG. 1 is an external perspective view illustrating an overall structure of a welding system 100 to which a work measuring method according to the present embodiment is applicable. The welding system 100 includes a welding device 1, a positioner 2, a welding robot 3, a welding control device 8, a controller 9, and a camera 10 (first sensor).

The welding device 1 is configured in such a way that the welding robot 3 welds a work W held by the positioner 2. The welding control device 8 is configured to cause the controller 9 to control the welding robot 3. The welding control device 8 may be configured to control moving units 11 and 12 to control the relative position of the welding robot 3 and the work W. The welding control device 8 is also configured to control the rotational operation of the positioner 2 and the photographing operation of the camera 10. In the present embodiment, the welding control device 8 is described as one that controls the overall operation related to welding. Alternatively, different controllers may be provided for respective devices to perform welding in a coordinated manner.

Figure 2:
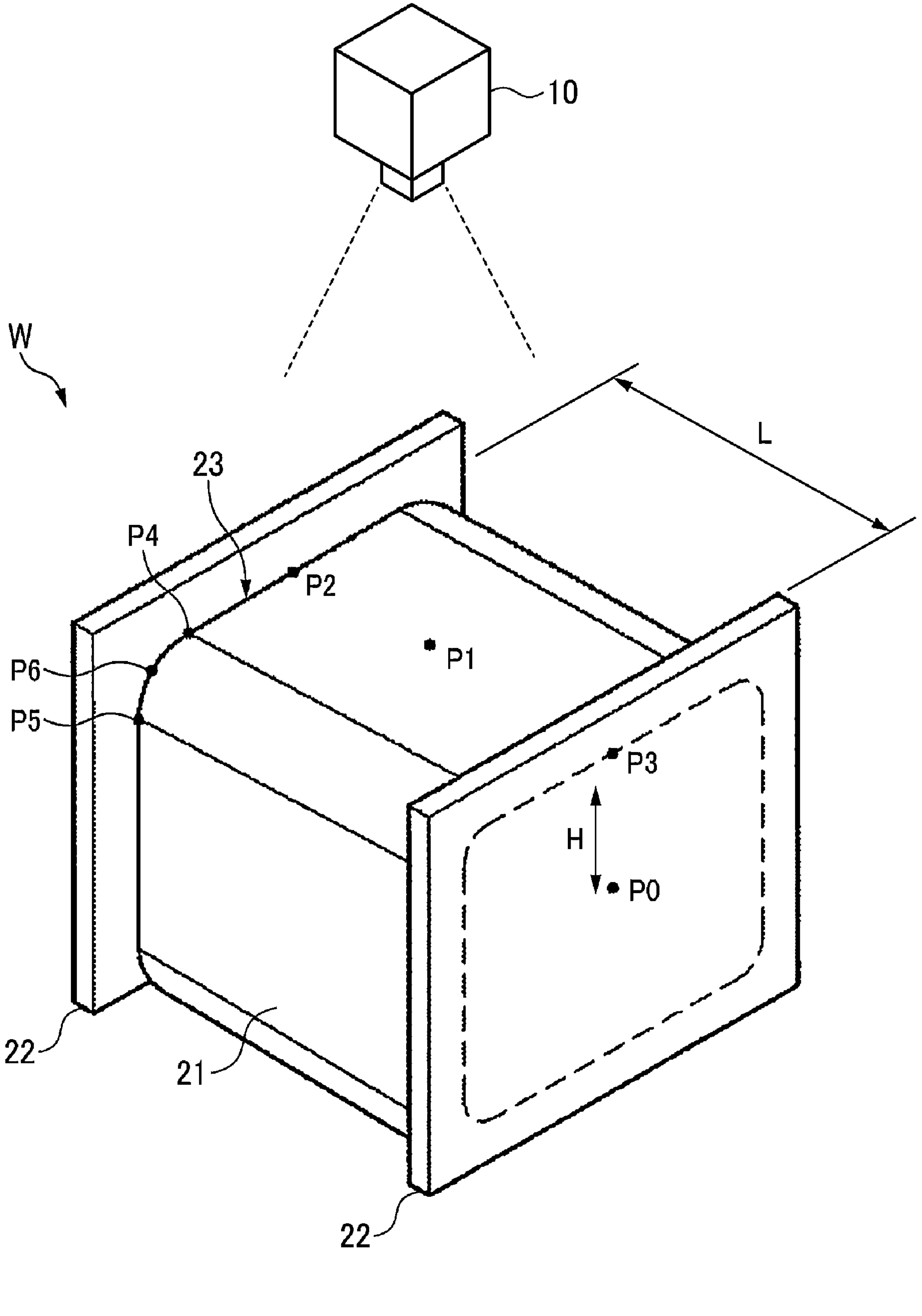
FIG. 2 is an external perspective view illustrating an exemplary configuration of a work (measurement object) according to the embodiment of the present invention.

As illustrated in FIG. 2, the work W according to the present embodiment includes a column 21 and diaphragms 22. The work W is held by the positioner 2 and installed to be rotatable about a predetermined axis. The positioner 2 is a faceplate configured to hold the work W and secure the work W in the axial direction. The positioner 2 includes a rotary drive unit configured to turn the work W in the circumferential direction. Although the positioner 2 illustrated in FIG. 1 is a cantilever positioner configured to hold one end of the work W, a positioner configured to hold both ends of the work W may be used.

The welding robot 3 is configured to have various functions for welding various weld joints of the work W held by the positioner 2. For example, an arc welding robot may be used as the welding robot 3. The welding robot 3 includes a multi-joint arm 4, a welding torch 5 supported by the arm 4, a welding wire 6 fed to the tip of the welding torch 5, and a sensor 7 (second sensor) capable of position detection at the tip of the welding torch 5.

The sensor 7 is disposed near the distal end of the welding robot 3. By moving the welding robot 3, the sensor 7 measures the coordinates of a preset detection position on the work W as measurement data. The sensor 7 may be of any type that is capable of measuring the coordinates of the work W as measurement data. The sensor 7 may be a non-contact position detection sensor, such as a laser sensor, or a contact position detection sensor, such as a touch sensor. In the present embodiment, the sensor 7 will be described as one that provides a touch sensing function for measuring the position and shape of the work W. The measurement data measured by the sensor 7 may include coordinate information at positions other than the detection position.

The controller 9 is configured to control the welding robot 3 in accordance with a measurement program and a welding program that are defined in advance. Specifically, by moving the welding robot 3 on the basis of the measurement program, the sensor 7 included in the welding robot 3 measures the coordinates of the detection position on the work W as measurement data. The work W is welded by moving the welding robot 3 on the basis of the welding program. The measurement program and the welding program are provided by the welding control device 8.

The camera 10 is used to photograph the work W before welding and identify, for example, the shape, dimensions, and position of the work W. The camera 10 is configured to be capable of acquiring point cloud data on the surface of the work W as three-dimensional data. A sensor, such as a time-of-flight (ToF) camera, a stereo camera, or a light detection and ranging (LiDAR) sensor, can be used as the camera 10. These sensors have different characteristics and thus may be used depending on the measurement environment and type of the work W (measurement object). In the present embodiment, the camera 10 is installed above the work W and the positioner 2, and is configured to be capable of photographing the work W placed below the camera 10. The installation position and the photographing direction of the camera 10 are not limited to those described above, and may be set to any position and direction in accordance with the axis about which the work W is rotated by the positioner 2.

A ToF camera that can be used as the camera 10 is configured to irradiate the measurement object with laser light and measure the reflected laser light with an imaging element to calculate the distance for each pixel. The measurable distance of the ToF camera is from about several tens of centimeters (cm) to several meters (m). A stereo camera is configured to use a plurality of images taken by a plurality of (e.g., two) cameras to calculate the distance from the parallax between the images. The measurable distance of the stereo camera is from about several tens of centimeters (cm) to several meters (m). A LiDAR sensor is configured to irradiate the surrounding area with laser light and measure the reflected laser light to calculate the distance. The measurable distance of the LiDAR sensor is from about several tens of centimeters (cm) to several tens of meters (m).

The moving units 11 and 12 are configured to move the welding robot 3 in at least one of directions parallel and orthogonal to the direction of the rotation axis of the work W held by the positioner 2. Specifically, a carriage may be used as the moving unit 11, and a rail may be used as the moving unit 12. The moving unit 12 is configured to travel along the moving unit 11 parallel to the rotation axis of the positioner 2 to move the welding robot 3 disposed on the moving unit 12 in the direction parallel to the axial direction of the work W. The moving unit 12 is configured to be movable in the direction orthogonal to the moving unit 11 to move the welding robot 3 disposed on the moving unit 12 in the direction orthogonal to the axial direction of the work W.

In the present embodiment, the following three three-dimensional coordinate systems are used: a robot coordinate system which is the coordinate system of the welding robot 3, a positioner coordinate system which is the coordinate system of the positioner 2, and a camera coordinate system which is the coordinate system of the camera 10. These three-dimensional coordinate systems are associated with each other in such a way that coordinate values can be transformed. The coordinate systems may each be relatively defined with respect to another one, or may each be defined as an absolute coordinate system. When a specific coordinate system is to be described, the coordinate system will be specified.

(Work)

FIG. 2 is an external perspective view illustrating an exemplary configuration of the work W (measurement object) according to the present embodiment. The camera 10 is disposed above the work W and is capable of acquiring point cloud data on the surface of the work W. The work W includes one column 21 and two diaphragms 22 disposed on both sides of the column 21. The column 21 may be a columnar member having a rectangular cylindrical shape (e.g., rectangular steel pipe) or a circular cylindrical shape (e.g., circular steel pipe). The outer periphery of the column 21 includes a flat portion and a curved portion having a given curvature depending on the shape. The curvature of the curved portion is not particularly limited.

In FIG. 2, the length and the diameter of the column 21 are indicated by L and H, respectively. The diaphragms 22 have, for example, a rectangular shape. P0 to P6 illustrated in FIG. 2 indicate examples of position coordinates extracted from measurement data. The position coordinates extracted in the work W are not particularly limited. The work W is not limited to one having a single-core configuration illustrated in FIG. 2. For example, the work W may be one having a double-core configuration that includes two columns and three diaphragms between and at both ends of the two columns. When the work W has a double-core configuration, the position of the camera 10 may be adjusted in accordance with its photographing range, and point cloud data of the entire work W may be acquired by photographing multiple times. A groove 23 having a predetermined shape is formed at a connection portion between the column 21 and each diaphragm 22.

(Welding Control Device)

Figure 3:
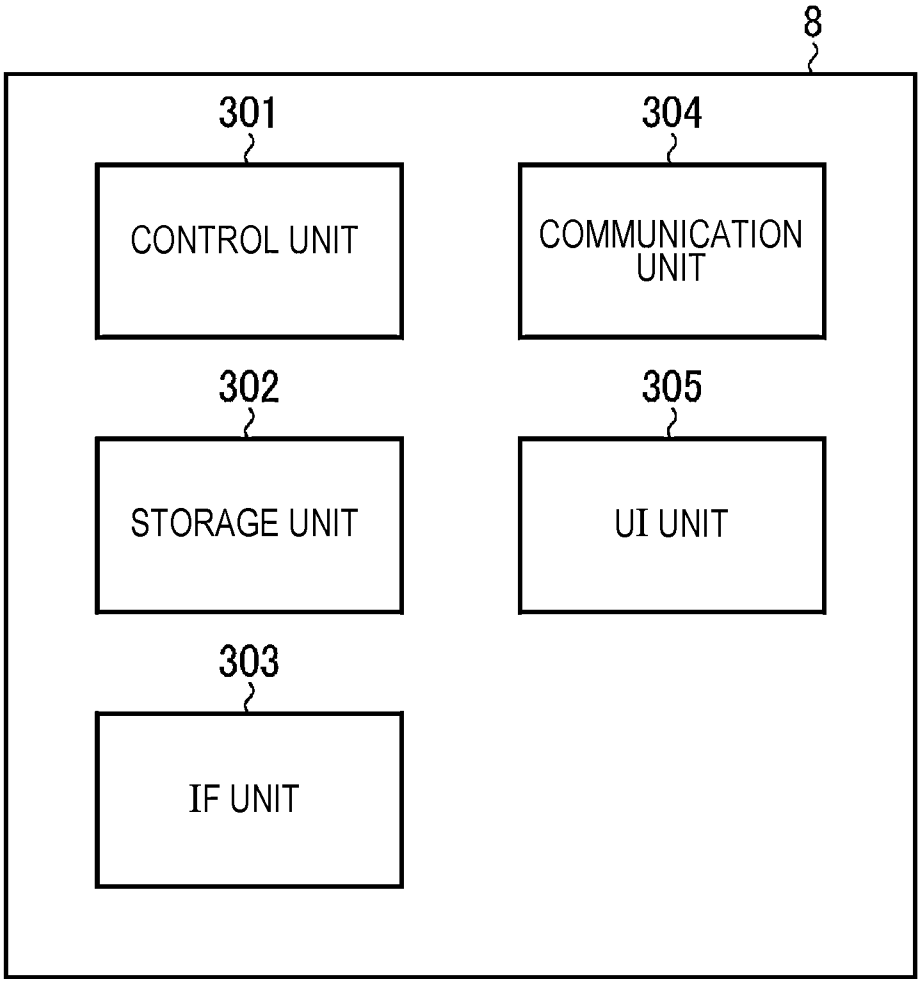
FIG. 3 is a block diagram illustrating an exemplary configuration of a welding control device according to the embodiment of the present invention.

FIG. 3 is a block diagram illustrating an exemplary configuration of the welding control device 8 according to the present embodiment. The welding control device 8 may be constituted by an information processing device, such as a personal computer (PC). The welding control device 8 includes a control unit 301, a storage unit 302, an interface (IF) unit 303, a communication unit 304, and a user interface (UI) unit 305.

The control unit 301 may be constituted, for example, by at least one of a central processing unit (CPU), a graphical processing unit (GPU), a micro-processing unit (MPU), a digital signal processor (DSP), and a field-programmable gate array (FPGA). The storage unit 302 is constituted by a volatile memory, such as a random-access memory (RAM), or by a non-volatile memory, such as a hard disk drive (HDD) or a read-only memory (ROM). The control unit 301 reads and executes various programs stored in the storage unit 302 to perform various functions described below.

The IF unit 303 is an interface for connection to an external device. The IF unit 303 is configured to control transmission to and reception from the external device. The IF unit 303 is connected to, for example, the controller 9 and the positioner 2.

The communication unit 304 is a component for communication with external devices and various sensors. Communication by the communication unit 304 may be either wired or wireless, and the communication standard is not limited. The UI unit 305 is configured to receive operations from the user and display a measurement result. The UI unit 305 may include, for example, a mouse and a keyboard (not illustrated), or may be constituted by a touch panel display that integrates a display unit and an operation unit. The components of the welding control device 8 are connected by an internal bus (not illustrated) so as to be capable of communicating with each other.

[Functional Configuration]

Figure 4:
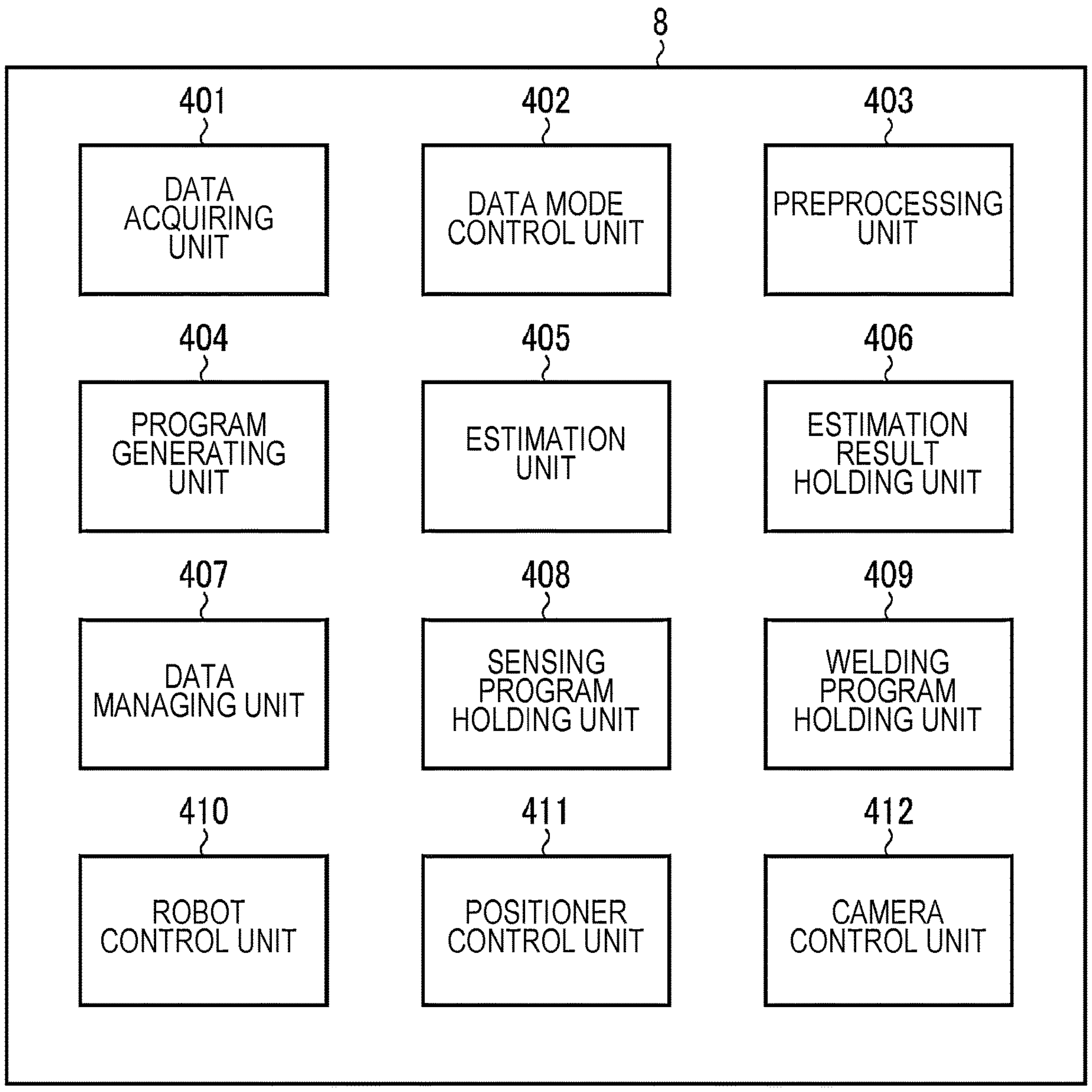
FIG. 4 is a block diagram illustrating an exemplary functional configuration of the welding control device according to the embodiment of the present invention.

FIG. 4 illustrates an exemplary functional configuration of the welding control device 8 according to the present embodiment. The components illustrated in FIG. 4 may be implemented when the control unit 301 of the welding control device 8 reads and executes a program stored in the storage unit 302. The configuration illustrated in FIG. 4 is merely an example; that is, one component may be configured as a plurality of components, or a plurality of components may be configured as one component. When a plurality of control devices perform welding in a coordinated manner in the welding system 100, each of the components illustrated in FIG. 4 may be disposed in a corresponding one of the control devices in accordance with the configuration.

A data acquiring unit 401 is configured to acquire point cloud data of the work W (measurement object) through the camera 10. The data acquiring unit 401 is configured to also acquire various types of data measured by a touch sensing function using the sensor 7 at the distal end of the welding robot 3. A data mode control unit 402 is configured to control operation mode in the welding system 100. For example, the data mode control unit 402 may control mode and parameters related to measurement of the work W performed before welding, and may also control mode and parameters used during welding.

A preprocessing unit 403 is configured to perform preprocessing on point cloud data acquired. The preprocessing performed here may vary depending on the point cloud data to be used. Examples of the preprocessing include filter processing, outlier removal processing, clustering, and coordinate transformation. A program generating unit 404 is configured to modify a general-purpose welding program or sensing program stored in advance on the basis of the measurement result to generate a program appropriate for the work W to be welded.

An estimation unit 405 is configured to estimate the shape of the work W using point cloud data acquired. Details of the estimation will be described later on below. An estimation result holding unit 406 is configured to hold, as an estimation result, the shape and position of the work W estimated through estimation performed by the estimation unit 405. A data managing unit 407 is configured to hold predefined information about the work W and data related to welding operation.

A sensing program holding unit 408 is configured to hold a sensing program for sensing performed using the sensor 7 at the distal end of the welding robot 3. A welding program holding unit 409 is configured to hold a welding program used in welding performed using the welding robot 3.

A robot control unit 410 is configured to cause the controller 9 to control the welding robot 3, by using the welding program and the sensing program, to perform various operations. The robot control unit 410 may be configured to also control the moving units 11 and 12. A positioner control unit 411 is configured to control the positioner 2 holding the work W, by using the welding program and the sensing program, to perform a rotational operation and the like. A camera control unit 412 is configured to control a measurement operation performed by the camera 10.

Exemplary Measurement

Figure 5:
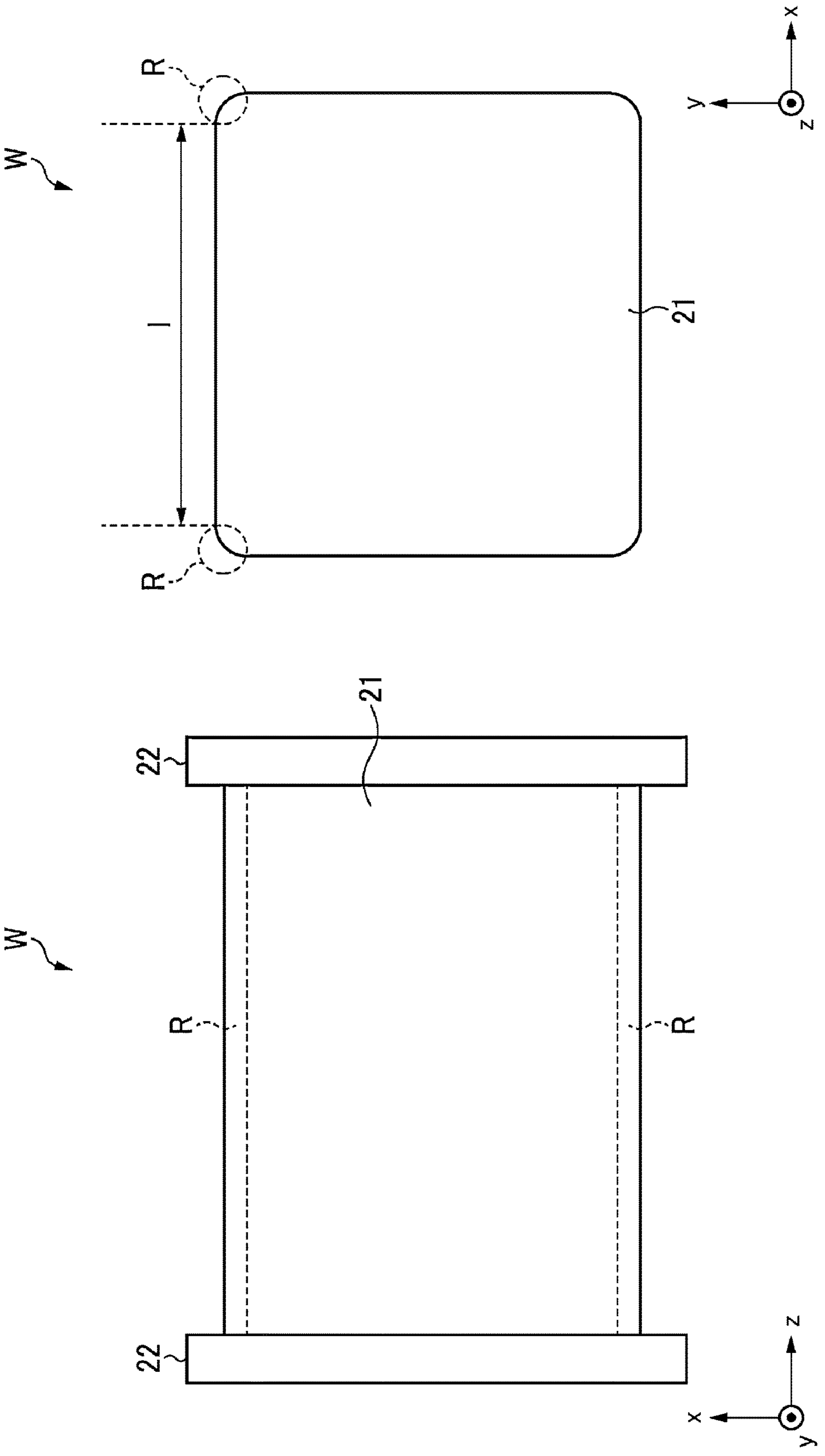
FIG. 5 is a schematic diagram for explaining an exemplary configuration of the work according to the embodiment of the present invention.

An example of measuring the work W according to the present embodiment will be described using FIG. 5 to FIG. 8B. FIG. 5 is an external view of the work W. The origin of the coordinate axes illustrated in FIG. 5 differs in position from that of the positioner coordinate system in the positioner 2, but the orientation of the coordinate axes illustrated in FIG. 5 corresponds to that of the positioner coordinate system. As described using FIG. 2, the work W includes the column 21 and the diaphragms 22. In FIG. 5, a region R has a curved surface. Depending on the photographing direction of the camera 10, it may not be possible to accurately acquire the shape of the work W as point cloud data. As indicated by a length l, a dimension of the work W may be detected shorter than it originally is. The present embodiment is configured to accommodate measurement of the work W with such a shape.

Figure 6:
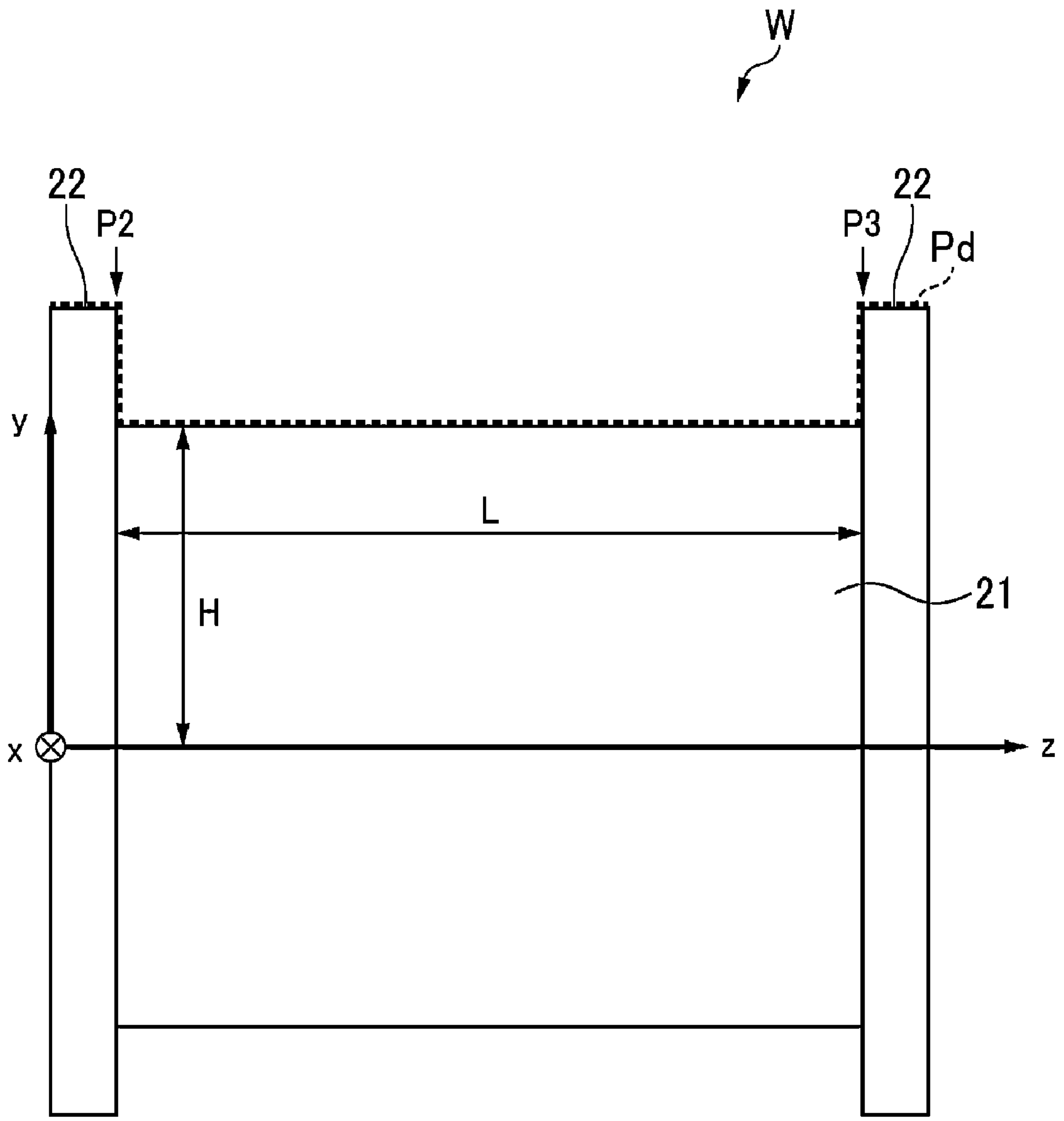
FIG. 6 is a schematic diagram for explaining measurement of the work according to the embodiment of the present invention.

FIG. 6 illustrates the work W as laterally viewed along the x axis direction. The coordinate system superimposed on the work W is the positioner coordinate system. As illustrated in FIG. 1, the positioner 2 holds the work W in the horizontal direction. Here, the z axis of the positioner coordinate system coincides with the rotation axis of the positioner 2. The camera 10 photographs the work W in the y axis direction.

In FIG. 6, the length L indicates the length of the column 21 in the z axis direction, and the diameter H indicates the radius of the column 21. Point cloud data Pd is point cloud data is projected onto the yz plane. The point cloud data represents the outer shape of the work W acquired by the camera 10. P2 and P3 indicate connection positions of the diaphragms 22 and the column 21 illustrated in FIG. 2. As indicated by P2 and P3, in the yz plane, the connection positions of the diaphragms 22 and the column 21 can be regarded as change points in point cloud data where the distribution of the point cloud data changes in a predetermined direction. The diameter H of the column 21 can be derived on the basis of the y coordinate value in the positioner coordinate system. The length L of the column 21 can be derived on the basis of the y coordinate value and the z coordinate value in the positioner coordinate system. The length of the diaphragms 22 in the z axis direction, that is, the plate thickness of the diaphragms 22, can also be derived on the basis of the y coordinate value and the z coordinate value in the positioner coordinate system.

Figure 7A:
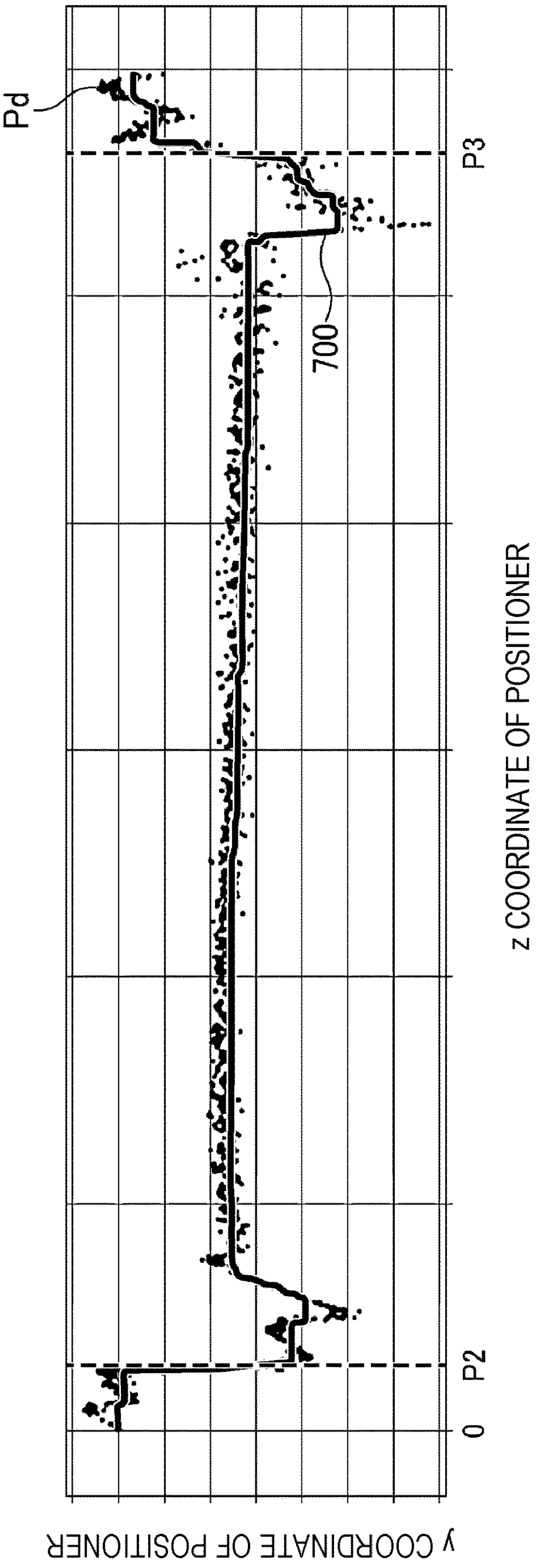
FIG. 7A is a graph illustrating an exemplary result of measurement of the work according to the embodiment of the present invention.

FIG. 7A illustrates an example of point cloud data acquired by measuring the work W. In FIG. 7A, the horizontal axis represents the z coordinate value in the positioner coordinate system, and the vertical axis represents the y coordinate value in the positioner coordinate system. The origin of the z coordinate corresponds to the position at which the work W is held by the positioner 2.

A solid line 700 represents the position coordinate of the surface of the work W estimated from the point cloud data. P2 and P3 of the work W indicate actual connection positions of the column 21 and the diaphragms 22. As illustrated in FIG. 7A, grooves exist at the connection positions of the column 21 and the diaphragms 22 before welding. The solid line 700 can be obtained, for example, by change point detection using the fused lasso method. In the solid line 700, for example, a point that is a predetermined threshold away from a minimum y coordinate value can be regarded as a change point. In the example illustrated in FIG. 7A, a point that is a predetermined threshold away from a minimum y coordinate value is detected at the positions of P2 and P3.

Figure 7B:
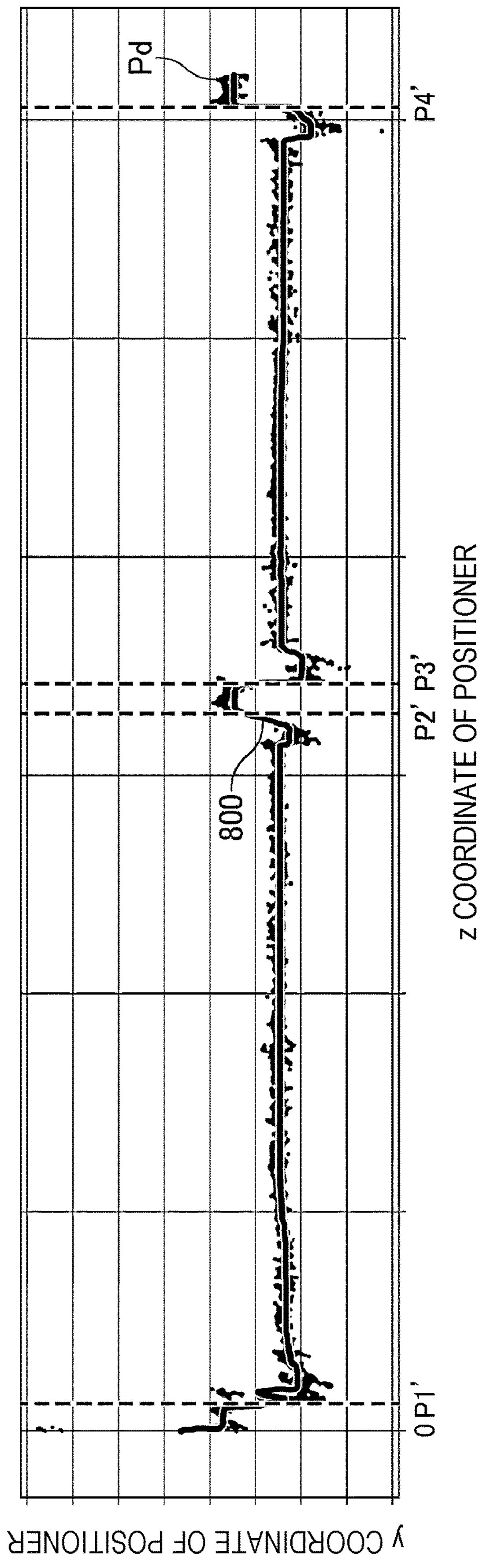
FIG. 7B is a graph illustrating an exemplary result of measurement of the work according to the embodiment of the present invention work.

FIG. 7B illustrates an example of point cloud data acquired by measuring a double-core work. In FIG. 7B, the horizontal axis represents the z coordinate value in the positioner coordinate system, and the vertical axis represents the y coordinate value in the positioner coordinate system. The origin of the z coordinate corresponds to the position at which the work W is held by the positioner 2. A solid line 800 represents the position coordinate of the surface of the work W estimated from the point cloud data. P1' to P4' indicate actual connection positions of columns and diaphragms. As illustrated in FIG. 7A and FIG. 7B, the change points in the point cloud data corresponding to the connection positions of the columns and diaphragms, that is, the portions where the distribution of the point cloud data changes, are detected. Thus, the number of constituent elements of the work W, that is, the number of columns and the number of diaphragms, can be derived.

Figure 8A:
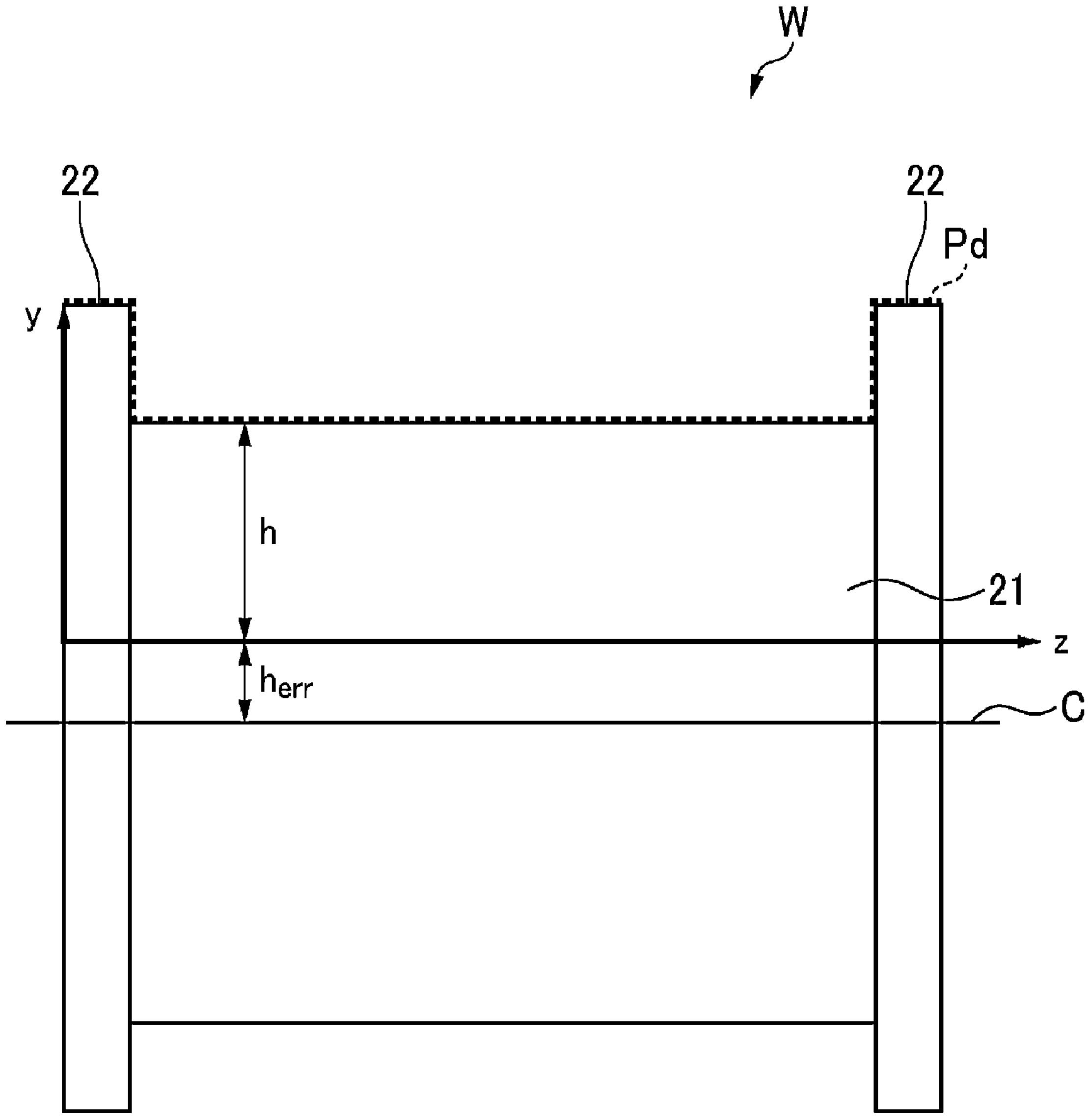
FIG. 8A is a schematic diagram for explaining correction of a work installation error according to the embodiment of the present invention.

A description will now be given of how an installation error of the work W with respect to the positioner 2 according to the present embodiment is to be dealt with. Assume that the position at which the work W is held by the positioner 2 deviates from the rotation axis of the positioner 2. In this case, as illustrated in FIG. 8A, a central axis C of the column 21 deviates from the rotation axis (corresponding to the z axis) of the positioner 2. This results in a deviation in the measured diameter of the column 21. In the example illustrated in FIG. 8A, there is an installation error $h_{err}$ with respect to an actual measured value h. In this case, the actual diameter of the column 21 is $(h+h_{err})$.

In the present embodiment, such an installation error of the positioner 2 is taken into account, and the positioner 2 is rotated to perform multiple measurements. The installation error is corrected on the basis of the results of the multiple measurements.

Figure 8B:
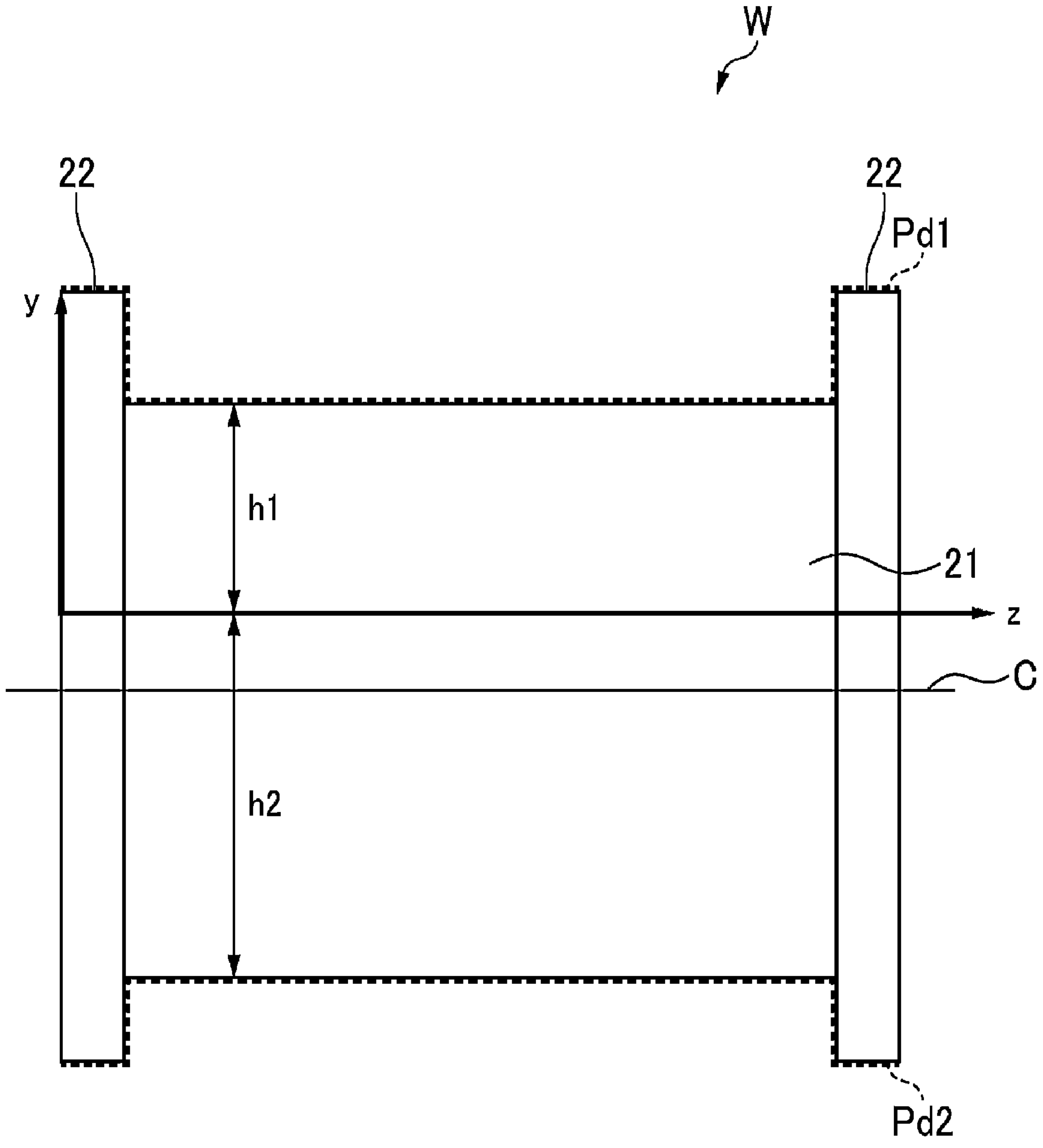
FIG. 8B is a schematic diagram for explaining correction of a work installation error according to the embodiment of the present invention.

FIG. 8B is a diagram for explaining the concept of correcting an installation error. Here, the central axis C of the column 21 deviates from the rotation axis (corresponding to the z axis) of the positioner 2. Pd1 represents point cloud data obtained in the first measurement. The diameter of the column 21 obtained on the basis of the point cloud data Pd1 is h1, which differs from an actual value due to an installation error. After the positioner 2 rotates the work W 180 degrees about the rotation axis (corresponding to the z axis), another measurement is performed. As a result, Pd2 is obtained as point cloud data. The diameter of the column 21 obtained on the basis of the point cloud data Pd2 is h2.

In the present embodiment, an installation error is corrected by averaging the values obtained by multiple measurements. Thus, with the influence of the installation error eliminated by $H=(h1+h2)/2$, the diameter H of the column 21 can be calculated. Other rotation angles may be used depending on the direction of the installation error. For example, the rotation angle of the positioner 2 may be 90 degrees or 270 degrees. The number of measurements is not limited to two, and more measurements may be performed in consideration of measurement accuracy.

With the point cloud data obtained by the camera 10, approximate dimensions and installation position of each component of the work W can be identified. On the basis of this result, the welding robot 3 can be brought closer to the work W. In welding, the position of the tip of the welding torch 5 can be controlled with higher precision. More precise position detection is thus performed by touch sensing using the sensor 7 at the distal end of the welding robot 3. In other words, with the point cloud data obtained by the camera 10, it is possible to estimate the dimensions and installation position of the work W with a certain degree of precision, move the welding robot 3 to the vicinity of the work W, and adjust the start position of touch sensing. The time required for touch sensing by the sensor 7 can thus be reduced.

After the dimensions and installation position of the work W are estimated with a certain degree of precision by the technique using the point cloud data described above, the region R and the groove are precisely measured by touch sensing of the sensor 7, and the dimensions and installation position of the work W can be corrected. It is thus possible to accurately identify the welding position of the work W and achieve more precise automatic welding.

[Processing Flow]

Figure 9:
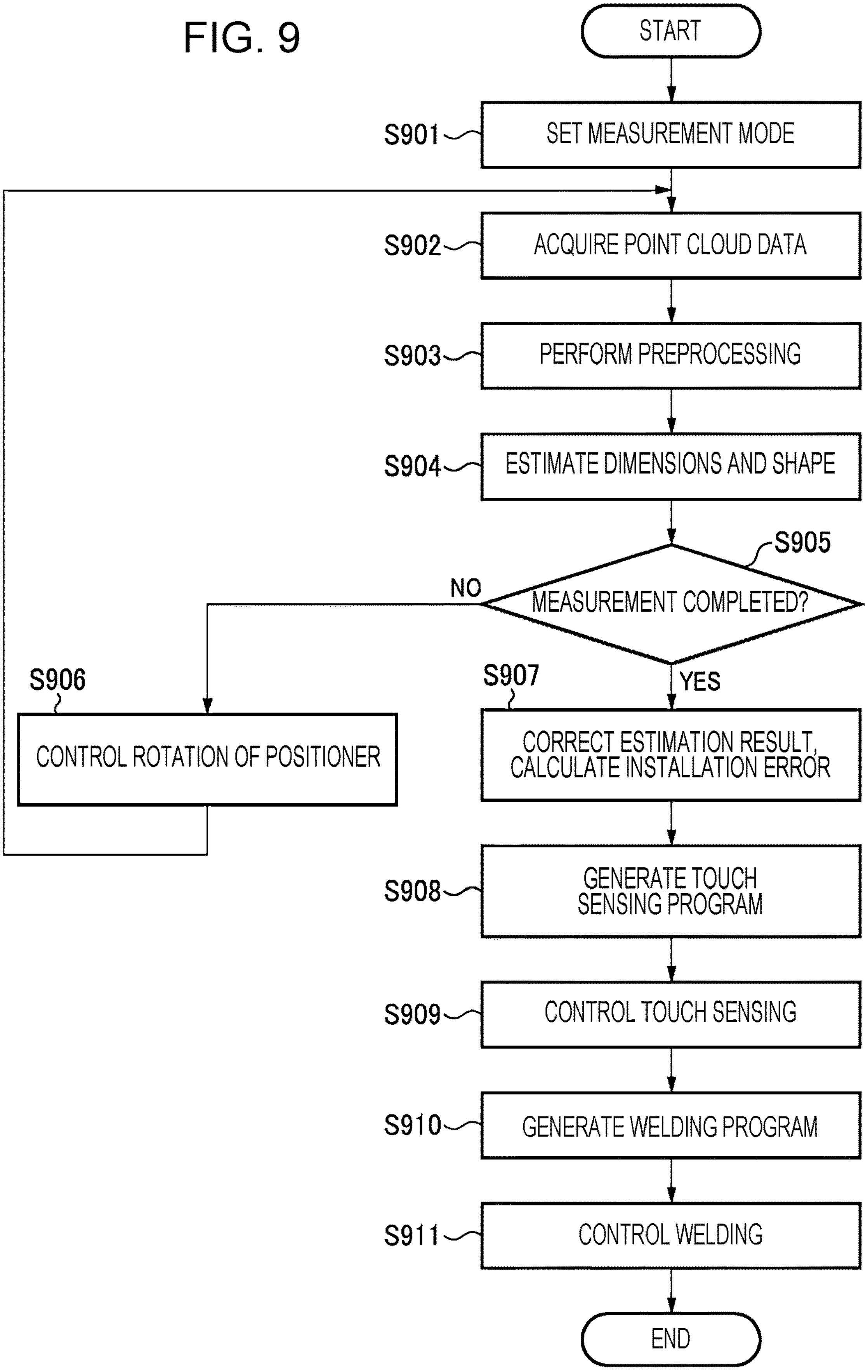
FIG. 9 is a flowchart illustrating a welding process according to the embodiment of the present invention.

A flow of welding, including work measurement processing, according to the present embodiment will now be described. FIG. 9 is a flowchart illustrating the entire flow of welding, including work measurement processing, according to the present embodiment. Each step is performed when the welding control device 8 illustrated in FIG. 1 controls each component of the welding system 100. For simplicity, the process will be described as being performed by the welding control device 8. Before the present processing flow is started, the work W is held by the positioner 2 and placed at a position where it can be photographed by the camera 10.

In step S901, the welding control device 8 sets a measurement mode. The measurement mode may be a mode designated by the user, or may be a mode defined in advance. For example, it may be possible to set a measurement mode in which multiple measurements are performed by varying the rotation angle of the positioner 2 as described above, or a measurement mode in which only a single measurement is performed.

In step S902, the welding control device 8 photographs the work W using the camera 10 to acquire point cloud data. If the size of the work W is smaller than a predetermined size, the point cloud data may be acquired in one photographing operation. If the size of the work W is greater than a predetermined size, a plurality of pieces of point cloud data may be acquired in a plurality of photographing operations and integrated. In the present step, in photographing, the photographing range and the photographing angle may be adjusted by the welding control device 8 in accordance with the position of the positioner 2, or may be defined in accordance with the measurement mode set in step S901.

In step S903, the welding control device 8 performs preprocessing on the point cloud data acquired in step S902. Examples of the preprocessing include filter processing, outlier removal processing, clustering, and coordinate transformation. The preprocessing in the present step may be omitted, as long as necessary processing is performed in accordance with the configuration of the point cloud data acquired in step S902.

Filter processing may be processing in which point clouds included in point cloud data are resampled at regular intervals by using, for example, a known voxel grid filter to make a point cloud density per predetermined volume uniform. Outlier removal processing may be processing of removing outliers that may degrade measurement accuracy. The outliers may be identified from statistical information, such as the mean and variance of neighboring point clouds, or may be identified from the number of neighboring point clouds that are present within a predetermined radius. Clustering may be processing, for example, that divides point clouds included in point cloud data into a plurality of groups on the basis of distance, and deletes groups including point clouds fewer than or equal to a predetermined threshold, so that point clouds other than those representing the shape of the work W are removed. Coordinate transformation transforms the camera coordinate system of the camera 10 into a predetermined coordinate system on the basis of the photographing position and the photographing angle of the camera 10. The predetermined coordinate system may be, for example, the positioner coordinate system of the positioner 2. Parameters required for transforming the coordinate system may be derived, for example, through calibration in advance.

In step S904, the welding control device 8 estimates the dimensions and shape of the work W by using the point cloud data processed in step S903. The estimation here may include estimating the installation position of the work W and the number of the columns 21 and the diaphragms 22 included in the work W. In the present embodiment, as illustrated in FIG. 6, the length L and the diameter H of the column 21 are estimated.

As illustrated in FIG. 5, the column 21 of the work W may have the region R with a given curvature. The region R is wide when the column 21 is cylindrical (e.g., circular steel pipe). In the present embodiment, therefore, only point cloud data in the vicinity of the center of the column 21 is extracted in the xz plane of the positioner coordinate system. In the present embodiment, the zy plane is a horizontal plane and is orthogonal to the photographing direction of the camera 10. Here, the vicinity of the center of the work W may be in the range of $-50\text{ mm}<x<50\text{ mm}$ in the x axis direction when, for example, the positioner coordinate system is assumed to be that illustrated in FIG. 6. This range may be changed in accordance with, for example, the size and shape of the work W (measurement object) and the setting of the positioner coordinate system (i.e., installation position of the work W in the positioner 2). As point cloud data for this region, data, such as that illustrated in FIG. 7A, can be acquired.

In step S905, the welding control device 8 determines whether the measurement has been completed. For example, the determination may be made on the basis of whether a number of measurements defined on the basis of the mode set in step S901 have been performed. Alternatively, the welding control device 8 may receive an operation from the user and determine that the measurement has been completed on the basis of the operation. If the measurement has been completed (YES in step S905), the process of the welding control device 8 proceeds to step S907. If the measurement has not been completed (NO in step S905), the process of the welding control device 8 proceeds to step S906.

In step S906, the welding control device 8 controls the rotation of the positioner 2 to a predefined rotation angle. The rotation angle may be defined, for example, in accordance with the mode set in step S901. Specifically, when the first rotation angle is 0 degrees about the z axis of the positioner coordinate system, then 180 degrees, 90 degrees, 270 degrees, and the like may be appropriately used. The process of the welding control device 8 then returns to step S902 and is repeated.

In step S907, the welding control device 8 corrects the estimation result and calculates the installation error. Specifically, the correction and the calculation are performed as described using FIG. 8B. The present step may be performed when the work W is rotated by the positioner 2 and the measurement is performed multiple times. When the measurement is performed only once, the present step may be omitted. The process to be performed may be switched depending on the measurement result.

In step S908, the welding control device 8 generates a touch sensing program on the basis of the estimation result.

The touch sensing program is a general-purpose program defined in advance. The touch sensing program is generated by adjusting parameters for the work W on the basis of the dimensions and installation position of the work W based on the estimation result.

In step S909, the welding control device 8 operates the welding robot 3 and the like on the basis of the touch sensing program generated in step S908 to measure more precise dimensions and position of the work W with the sensor 7 installed at the distal end of the welding robot 3.

In step S910, the welding control device 8 generates a welding program on the basis of the dimensions and position of the work W measured in step S909. The welding program is a general-purpose program defined in advance. The welding program is generated by adjusting parameters for the work W on the basis of the more precise dimensions and installation position of the work W based on the measurement result.

In step S911, the welding control device 8 operates the welding robot 3 and the like on the basis of the welding program generated in step S910 to perform welding on the work W. After completion of the welding, the present processing flow ends.

The present embodiment can thus accurately measure the configuration of the measurement object while making the time required to measure the measurement object shorter than before. In particular, it is possible to easily estimate the number and positions of the columns and diaphragms of the work with a certain degree of precision, and reduce the time required to operate the welding robot to perform measurement.

Other Embodiments

The present embodiment can also be implemented by a process in which a program or an application for performing the function of at least one embodiment described above is fed to a system or an apparatus using a network or a storage medium and at least one processor in a computer of the system or apparatus reads and executes the program.

The present embodiment may be implemented by a circuit that performs at least one function. Examples of the circuit that performs at least one function include an application-specific integrated circuit (ASIC) and a field-programmable gate array (FPGA).

As described above, the present specification discloses the following.

(1) A work measuring method for measuring a work (e.g., work W) including a columnar member (e.g., column 21) and a diaphragm (e.g., diaphragm 22) and held by a positioner (e.g., positioner 2) includes an acquiring step of acquiring point cloud data on a surface of the work held by the positioner and photographed in a predetermined direction (e.g., y axis direction of the positioner coordinate system), a detecting step of identifying a portion where distribution of the point cloud data changes in a three-dimensional coordinate system of the positioner and detecting the portion as a boundary position (e.g., P2, P3) between the columnar member and the diaphragm, and a deriving step of deriving the number of columnar members and diaphragms included in the work on the basis of the boundary position detected in the detecting step.

With this configuration, it is possible to accurately measure the configuration of a measurement object while making the time required to measure the measurement object shorter than before. In particular, it is possible to easily estimate the number and positions of the columns and diaphragms of the work with a certain degree of precision, and reduce the time required to operate the welding robot to perform measurement.

(2) In the work measuring method according to (1), in the detecting step, the point cloud data is projected onto a plane (yz plane) parallel to the predetermined direction and defined by a first axis (e.g., y axis of the positioner coordinate system) corresponding to the predetermined direction and a second axis (e.g., z axis of the positioner coordinate system) orthogonal to the first axis, and a change point of the point cloud data is detected as a boundary position between the columnar member and the diaphragm.

With this configuration, it is possible to accurately measure the configuration of a measurement object while making the time required to measure the measurement object shorter than before. In particular, the work can be measured on the basis of the position at which the work is held by the positioner.

(3) The work measuring method according to (2) further includes a calculating step of calculating a dimension and position of the work on the basis of the boundary position detected in the detecting step.

With this configuration, the dimension and position of the work can be identified with a certain degree of precision before the welding robot is operated to perform measurement, and the start position of measurement using the welding robot can be adjusted on the basis of the identified dimension and position of the work. It is thus possible to shorten the time for measurement performed by the sensor installed in the welding robot.

(4) In the work measuring method according to (3), in the calculating step, at least one of a diameter of the columnar member, a length of the columnar member, and a plate thickness of the diaphragm is calculated.

With this configuration, the dimensions of the column and the diaphragm of the work can be measured before the welding robot is operated to perform measurement.

(5) In the work measuring method according to (3), in the acquiring step, a plurality of pieces of point cloud data are acquired by rotating the work a predetermined rotation angle about the second axis with the positioner, and in the calculating step, the dimension and position of the work are calculated on the basis of the plurality of pieces of point cloud data.

With this configuration, a more precise measurement is achieved by taking into consideration an installation error of the work with respect to the positioner.

(6) In the work measuring method according to (2), in the detecting step, the boundary position is detected by using a part of point cloud data projected onto a plane (e.g., xz plane) orthogonal to the predetermined direction and defined by the second axis and a third axis (e.g., x axis of the positioner coordinate system) orthogonal to the first axis and the second axis. The part of the point cloud data is in a predetermined range from a center in a direction of the third axis.

By thus removing point cloud data in a region where the measurement accuracy may be degraded depending on the configuration of the sensor, the configuration of the work can be derived with higher accuracy.

(7) The work measuring method according to (3) further includes a correcting step of correcting, through sensing, at least one of the dimension and position of the work calculated in the calculating step.

With this configuration, in a welding system, correction can be performed by more precise sensing on the basis of a measurement result coarsely obtained.

(8) A welding system (e.g., welding system 100) includes a welding robot (e.g., welding robot 3) including a welding torch (e.g., welding torch 5), a welding control device (e.g., welding control device 8) configured to control the welding robot, a positioner (e.g., positioner 2) configured to hold a work (e.g., work W) including a columnar member (e.g., column 21) and a diaphragm (e.g., diaphragm 22), and a sensor (e.g., camera 10) configured to photograph the work in a predetermined direction to acquire point cloud data. The welding control device includes an acquiring unit (e.g., control unit 301, IF unit 303, data acquiring unit 401) configured to acquire point cloud data on a surface of the work held by the positioner and photographed by the sensor in the predetermined direction, a detecting unit (e.g., control unit 301, estimation unit 405) configured to identify a portion where distribution of the point cloud data changes in a three-dimensional coordinate system of the positioner and detect the portion as a boundary position between the columnar member and the diaphragm, and a calculating unit (e.g., control unit 301, estimation unit 405) configured to calculate a dimension and position of the work on the basis of the boundary position detected by the detecting unit.

With this configuration, it is possible to accurately measure the configuration of a measurement object while making the time required to measure the measurement object shorter than before.

(9) In the welding system according to (8), the welding torch includes a second sensor (e.g., sensor 7), and the welding control device includes a correcting unit (e.g., control unit 301, program generating unit 404) configured to correct, through sensing by the second sensor, at least one of the dimension and position of the work calculated by the calculating unit.

With this configuration, the dimension and position of the work can be identified with a certain degree of precision before the welding robot is operated to perform measurement, and the start position of measurement using the welding robot can be adjusted on the basis of the identified dimension and position of the work. It is thus possible to shorten the time for measurement performed by the sensor installed in the welding robot.

What is claimed is:

1. A work measuring method for measuring a work including a columnar member and a diaphragm and held by a positioner, the work measuring method comprising:

an acquiring step of acquiring point cloud data on a surface of the work held by the positioner and photographed in a predetermined direction;

a detecting step of identifying a portion where distribution of the point cloud data changes in a three-dimensional coordinate system of the positioner and detecting the portion as a boundary position between the columnar member and the diaphragm, the point cloud data being projected onto a plane parallel to the predetermined direction and defined by a first axis corresponding to the predetermined direction and a second axis orthogonal to the first axis, and a change point of the point cloud data being detected as the boundary position between the columnar member and the diaphragm, the change point being a point that is predetermined threshold away from a minimum coordinate value in the first axis and corresponding to a groove at a connection position of the columnar member and the diaphragm before welding;

a deriving step of deriving the number of columnar members and diaphragms included in the work based on a number of boundary positions detected in the detecting step;

a calculating step of calculating a dimension and position of the work based on boundary position detected in the detecting step; and a controlling step of controlling a welding robot for welding the work based on the dimension and position of the work calculated in the calculating step.

2. The work measuring method according to claim 1, wherein in the calculating step, at least one of a diameter of the columnar member, a length of the columnar member, and a plate thickness of the diaphragm is calculated.

3. The work measuring method according to claim 1, wherein in the acquiring step, a plurality of pieces of point cloud data are acquired by rotating the work a predetermined rotation angle about the second axis with the positioner, and in the calculating step, the dimension and position of the work are calculated based on the plurality of pieces of point cloud data.

4. The work measuring method according to claim 1, wherein in the detecting step, the boundary position is detected by using a part of point cloud data projected onto a plane orthogonal to the predetermined direction and defined by the second axis and a third axis orthogonal to the first axis and the second axis, the part being in a predetermined range from a center in a direction of the third axis.

5. The work measuring method according to claim 1, further comprising a correcting step of correcting, through sensing, at least one of the dimension and position of the work calculated in the calculating step.

6. A welding system comprising:

a welding robot including a welding torch;

a welding control device configured to control the welding robot;

a positioner configured to hold a work including a columnar member and a diaphragm; and a sensor configured to photograph the work in a predetermined direction to acquire point cloud data, wherein the welding control device includes circuitry configured to acquire point cloud data on a surface of the work held by the positioner and photographed by the sensor in the predetermined direction, identify a portion where distribution of the point cloud data changes in a three-dimensional coordinate system of the positioner and detect the portion as a boundary position between the columnar member and the diaphragm, the point cloud data being projected onto a plane parallel to the predetermined direction and defined by a first axis corresponding to the predetermined direction and a second axis orthogonal to the first axis, and a change point of the point cloud data being detected as the boundary position between the columnar member and the diaphragm, the change point being a point that is predetermined threshold away from a minimum coordinate value in the first axis and corresponding to a groove at a connection position of the columnar member and the diaphragm before welding, and calculate a dimension and position of the work based on the detected boundary position.

7. The welding system according to claim 6, wherein the welding torch includes a second sensor; and the welding control device includes circuitry configured to correct, through sensing by the second sensor, at least one of the calculated dimension and position of the work.

8. The work measuring method according to claim 1, further comprising a generating step of generating a touch sensing program to measure a more precise dimension and position of the work based on the dimension and position of the work calculated in the calculating step, and an operating step of operating the welding robot based on the touch sensing program, wherein the controlling step controls the welding robot based on the measured more precise dimension and position of the work.

* * * * *